Feb. 7, 1956 — H. W. TREVASKIS — 2,733,727
FLUID PRESSURE VALVE
Filed Feb. 15, 1952 — 2 Sheets—Sheet 2

INVENTOR
Henry William Trevaskis
by Benj. T. Pauber
his attorney ized Feb. 7, 1956

United States Patent Office

2,733,727

FLUID PRESSURE VALVE

Henry William Trevaskis, Solihull, England, assignor to Dunlop Rubber Company Limited, London County, England, a British company Application February 15, 1952, Serial No. 271,779

Claims priority, application Great Britain February 24, 1951

10 Claims. (Cl. 137—102)

This invention relates to a valve for the selective control of fluid pressure and more particularly relates to a fast-operating pressure reducing valve.

There are many fluid pressure operated mechanisms, both hydraulic and pneumatic, that are operated by fluid pressure at a predetermined value. One example of a mechanism of this nature is a cocking mechanism for an automatic gun, e. g. a quick-firing cannon for aircraft, which is cocked by means of a fluid-pressure operated mechanism, the subsequent operation of the gun being automatic. The cocking mechanism is operated at a predetermined value of fluid pressure and a valve is interposed between the mechanism and the source of pressure fluid, the function of the valve, which is under the control of an operator, being that of reducing the pressure from the source to the predetermined value required to operate the cocking mechanism. It is desirable that this valve should be fast and positive in operation, and should also be light and compact. It is the object of this invention to provide an improved valve of this nature.

According to the invention a fluid pressure control valve comprises a valve housing having a pressure chamber adapted to be connected to a source of fluid pressure, an outlet nozzle adapted to be connected to a mechanism to be operated, an inlet valve, an exhaust valve, means slidable within the housing to first close the exhaust valve and then open the inlet valve to allow pressure fluid to flow from the pressure chamber to the mechanism to be operated, cam means to operate said slidable means, and means to close the inlet valve when a predetermined pressure in said mechanism has been attained.

Preferably the cam means comprises an arm pivotally secured to a lever exterior of the housing and provided with cam surfaces engaging, when the lever is depressed, with slidable means which first close the exhaust valve and then open the inlet valve. Pressure fluid flows into the mechanism to be operated and also reacts, through the slidable means and cam means, against a helical return spring. When the pressure in the mechanism has attained a predetermined value the return spring will have been deflected sufficiently to allow the inlet valve to close.

Preferably the inlet valve is of the type more fully described in my co-pending application Ser. No. 263,615, filed December 27, 1951, now Patent Number 2,668,035 dated February 2, 1954, and comprises two tubular valve members one of which is axially slidable to open and close the valve, and the exhaust valve is co-axial with and secured to said slidable valve member.

In order that the invention may be more fully described, reference is made to the accompanying drawing of a fast-acting fluid pressure reducing valve suitable for controlling the operation of a gun cocking mechanism, wherein—

Figure 1:
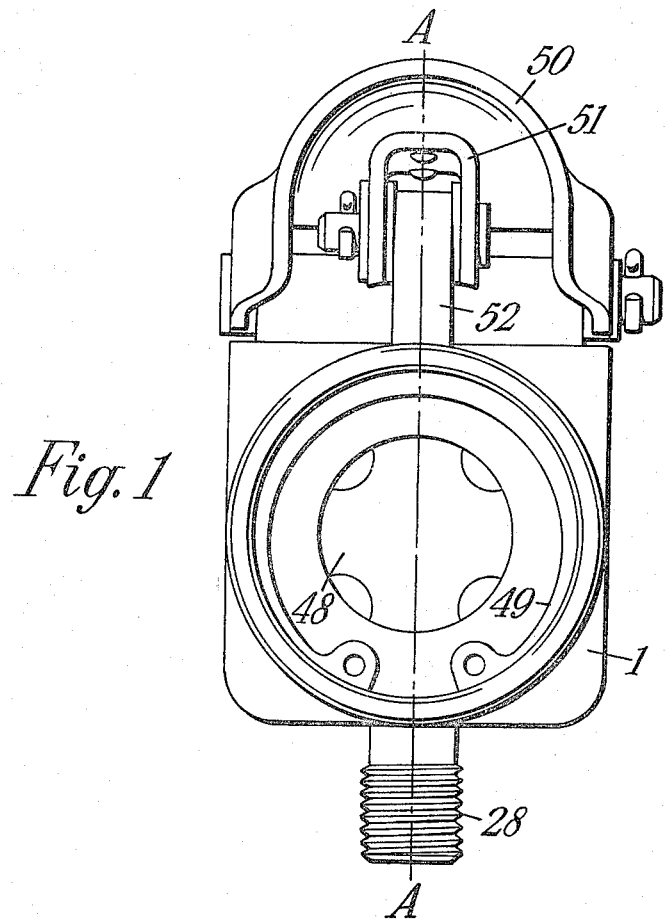
Figure 1 represents an end elevation of a fluid pressure valve according to one embodiment of the invention.
Figure 2:
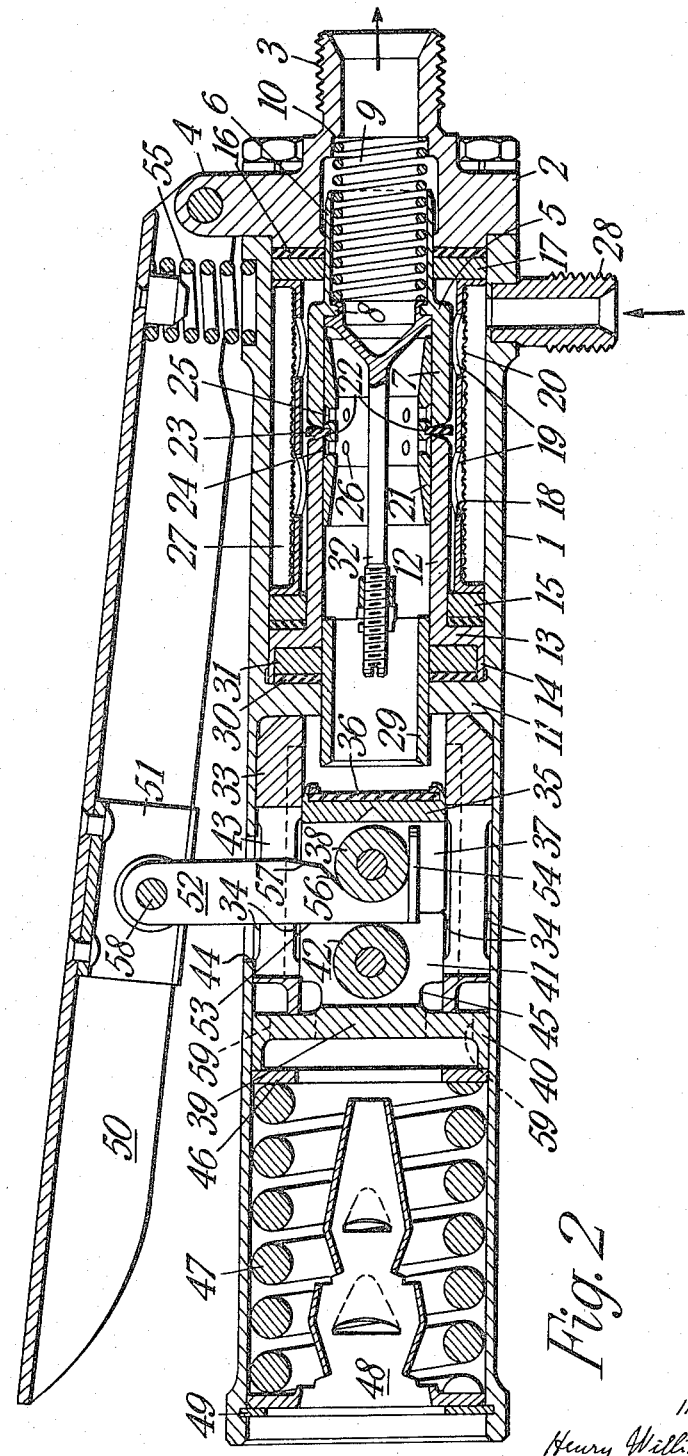
Figure 2 represents a sectional view of the same valve taken on the line A—A of Figure 1.

The valve comprises a cylindrical hollow housing 1 having an annular closure member 2 at one end thereof. The closure member is provided centrally with a nozzle 3 adapted to be connected to a gun cocking mechanism and the closure member 2 is also provided on its outer periphery with a lug 4 extending radially outwards therefrom.

A tubular valve member 5 is slidably fitted within the inner periphery of the closure member 2. The valve member is stepped to two diameters, the smaller diameter part 6 being slidable in said closure member and the larger diameter part 7 lying within the housing. The valve member is provided, at a location adjacent said step with an annular flange 8 extending radially inwards therefrom, and a helical compression spring 9 is provided having one end abutting said flange and the other end bearing against an abutment 10 formed in the end of the nozzle 3 adjacent the closure member 2. The wall of the large diameter part 7 of the valve member is of uniform thickness and the radial width of the step in the valve member equals said thickness. The end of the valve member remote from the closure member, i. e. the end of the larger diameter portion 7, is chamfered to an annular knife-edge, said knife-edge being at the inner periphery of the larger diameter portion 7.

The housing 1 is provided, about one third of its length from the closure member, with an annular wall 11 extending radially inwardly therefrom. A flanged tubular valve member 12 is non-slidably fitted in the housing and has a portion of the same diameter as the larger diameter part 7 of the slidable valve member 5, the end thereof being similarly chamfered. The end remote from the chamfered end is provided with an outwardly extending annular flange 13 and a skirt 14 extends axially therefrom away from the chamfered end, said skirt fitting tightly within the housing and the end thereof abutting one side of the annular wall 11. A sealing ring 15 is fitted against the side of the annular flange 13 remote from the annular wall 11 to prevent leakage of pressure fluid past the skirt 14, and a sealing ring 16 and lubricating washer 17 are likewise fitted against the inner side of the closure member 2 to prevent leakage past the inner periphery thereof and to lubricate the slidable valve member 5. Said rings and washers are maintained in position by a cylindrical spacing member 18 coaxially fitted between the housing 1 and the valve members 5 and 12 and provided at each end with a flange extending radially outwards to the housing wall, said spacing member 18 maintaining the sealing ring 15 in position against the flange 13 of the valve member 12 on the one hand the lubricating washer 17 and sealing ring 16 against the closure member 2 on the other hand. A plurality of holes 19 are provided in the wall of the spacing member and a gauze filter 20 is fitted to the outer periphery thereof to prevent foreign matter from passing therethrough.

A cylindrical sleeve 21 is slidably fitted within both tubular valve members, one part fitting in the larger diameter part 7 of the slidable valve member 5 and the other part fitting in the adjacent end of the flanged valve member 12. An annular groove 22 is provided around the outer periphery of the sleeve 21, midway between its ends, and an annular rubber seating washer 23 is fitted in said groove and extends radially outwardly therefrom. Equispaced one on each side of said central groove are two other annular grooves 24 and 25, and said grooves are each provided with a plurality of holes 26 communicating with the interior of the sleeve. The two adjacent ends of the valve members 5 and 12 are adapted to seat one on each side of the seating washer 23, and thus prevent passage of pressure fluid through the sleeve 21. The two valve members 5 and 12 and sleeve 21 together comprise an inlet valve and the annular chamber between the outer periphery of the valve members and the inner periphery of the housing comprises a pressure chamber 27, and this chamber is adapted to be connected, through a suitable nozzle 28, with a source of fluid pressure.

The construction and advantages of a valve of the type hereinabove described are more fully explained in my co-pending application Ser. No. 263,615 mentioned above.

A tubular exhaust valve 29 is slidably fitted through the inner periphery of the annular wall 11, a portion thereof being also slidable in the adjacent end of the flanged valve member 12. A sealing ring 30 and lubricating washer 31 are fitted between the flange 13 of said member 12 and the annular wall 11, the sealing ring being adapted to prevent the passage of pressure fluid along the interface between the inner periphery of the annular wall and the exhaust valve, and the lubricating washer being adapted to lubricate the valve 29.

One end of the exhaust valve 29 projects exterior of the wall 11 on the side remote from the closure member 2, and this end is chamfered. The other end of the valve is connected by means of an adjustable rod 32 with the slidable tubular valve member 5.

A cylindrical hollow member 33 is fitted within the housing 1, one end thereof abutting the annular wall 11, and the inner and outer peripheries of said member are provided with a plurality of axially-extending channels 34. Two plunger assemblies are slidably fitted within said hollow member 33, an exhaust plunger assembly and a return plunger assembly. The exhaust plunger assembly comprises a plug 35 slidable in said hollow member, said plug is provided on one face with a rubber valve seat 36 to co-operate with said exhaust valve 29. The other face of said plug is provided with a slot 37 of rectangular section extending diametrically across said face. A roller 38 is rotatably mounted in the slot, the axis of rotation of the roller being normal to the longitudinal axis of the slot.

The return plunger assembly comprises a plug portion 39 slidable in the hollow cylindrical member 33 and an integral flanged portion 40 slidable in the housing 1. The plug portion 39 is provided with a diametrical slot 41 and a roller 42 is rotatably mounted in said slot in a similar manner to that described in connection with the exhaust plunger assembly. The slotted faces of the two plugs are adjacent one another. The slots in the two plugs are aligned, and a slot 43 is provided in the wall of the hollow member 33 and also a slot 44 in the adjacent wall of the housing 1, said slots all being in line with one another.

The plug 39 of the return plunger assembly is provided with a recessed portion 45 where it joins the flange 40. An annular bearing ring 46 is slidably fitted in the housing and abuts the side of the flange 40 remote from the roller 42 and a helical return spring 47 of given rating is fitted in the housing, having one end abutting said bearing ring 46 and the other end abutting a similar bearing ring formed integral with a baffle 48 retained in the end of the housing 1 remote from the closure member 2 by a circlip 49. The baffle 48 reduces the exit velocity of the pressure fluid flowing through the exhaust valve and through holes 59 in the flange 40 of the plug 39 before it passes to atmosphere.

A lever 50 of part tubular section and having a length substantially equal to that of the the housing is pivotally secured at one end to the lug 4 integral with the closure member 2, the open side of the part tubular section being presented towards the housing. A member 51 of U-section is secured within the lever 50 at a location substantially midway between its ends and a substantially L-shaped member 52 is pivotally secured at 58, at the end of its longer arm, to said U-sectioned member 51. The L-shaped member 52 extends through the slots 44 and 43 in the housing 1 and hollow cylindrical member 33, respectively, the shorter arm fitting within the slots in the plugs 35 and 39 of the plunger assemblies. One side 53 of the longer arm of the L-shaped member 52 is planar and abuts the roller 42 associated with the return plunger assembly. The angle of the L is of part cylindrical form, and provides a seating for the roller 38 associated with the exhaust plunger assembly. The shorter arm 54 of the L bears against said roller 38 to restrict movement of the member 52 in one direction and a compression spring 55 is fitted between the housing 1 and lever 50 to normally maintain the lever at an angle at about 5° relative to the housing. Two straight cam surfaces 56 and 57 are provided on the side of the longer arm adjacent said roller 38, one surface 56 being at about an angle of 45° from the longitudinal axis of said arm which breaks into said cylindrical seating surface and the other surface 57 leading from said first cam surface 56 is at an angle of about 10° from the longitudinal axis of said arm and breaks into the side of the arm.

The normal position of the lever 50 is at an angle of about 5° relative to the housing 1 and in this position of the lever the roller 38 associated with the exhaust plunger assembly is seated in the part cylindrical surface of the L-shaped member 52 and the exhaust valve seat 36 is spaced a short distance away from the exhaust valve 29. The helical compression spring 9 interposed between the outlet nozzle 3 and the inwardly extending flange 8 of the slidable valve member 5 forces the chamfered end of said valve member into seating engagement with the seating ring 23 and likewise forces the seating ring into engagement with the chamfered end of the flanged valve member 12. The inlet valve is hence closed and pressure fluid from the pressure chamber 27 is prevented from passing therethrough and into the gun-cocking mechanism.

The operation of the valve is as follows. The operator pivots the lever 50 towards the housing 1, compressing the spring 55 between said lever and housing, and forcing the L-shaped member 52 further into the housing. The roller 38 associated with the exhaust plunger mechanism rides up the first cam surface, i. e. the steep cam surface 56, and moves the plug 35 axially towards the exhaust valve 29 until the exhaust valve seat 36 seats on said valve. Movement of the return plunger assembly in the other direction is prevented by the compression spring 47 interposed between the flange 40 of said plunger assembly and the end of the housing.

On further movement of the lever 50 in the same direction the roller 38 associated with the exhaust plunger assembly moves on to the second cam surface, i. e. the shallow cam surface 57, and the exhaust plunger assembly continues moving in the same axial direction, although, due to the less inclined angle of the cam, for a shorter axial distance for the same angular movement of the lever. The exhaust valve seat 36 is already seated on the exhaust valve 29 and thus continued movement of the said seat slidably moves the exhaust valve towards the closure member 2. The exhaust valve 29 and the slidable valve member 5 are interconnected by the adjustable rod 32, and hence movement of the exhaust valve 29 imparts a corresponding movement to the valve member 5, in the same direction, and against the spring-load tending to close the valve. The chamfered end of said valve member 5 moves away from the seating ring 23 and allows pressure fluid to flow through the holes 26 in the sleeve 21, into the tubular valve members 5 and 12 and hence into the gun cocking mechanism, the exhaust valve 29 remaining closed.

The pressure very quickly mounts up in the gun cocking mechanism, and this pressure also reacts against the effective area of the exhaust valve seat 36. The valve seat 36, together with its associated exhaust plunger assembly, the arm of the L-shaped member 52 and the return plunger assembly are thus forced in an axial direction away from the closure member 2, and against the force of the return spring 47 in the end of the housing, the L-shaped member 52 pivoting about its connection 58 with the lever 50. The exhaust valve 29 is connected to the slidable valve member 5, which is spring-loaded to move away from the closure member 2. The exhaust valve thus remains seated on the exhaust valve seat 36.

When the pressure in the gun cocking mechanism attains the predetermined value necessary to cock the gun, the slidable valve member 5 will have moved sufficiently for the chamfered end thereof to seat once more on the seating ring 23 and thus prevent the further flow of pressure fluid from the pressure chamber 27 into the mechanism. If the pressure in the mechanism should exceed said predetermined value, said pressure reacting on the exhaust valve 36 will further compress the main return spring 47 and move the seat and associated parts so that the seat 36 quits the exhaust valve 29. Excess pressure will then blow off through the exhaust valve until the predetermined pressure is once more attained when the exhaust valve will again close.

The predetermined pressure to cock the mechanism is substantially a function of the rating of the spring 47 and the effective area of the exhaust valve seat when the exhaust valve is seated. The only force necessary to open the valve, excluding the force of the spring 55 associated with the lever and various rolling and sliding frictional resistances, is the force necessary to overcome the spring 9 controlling the slidable valve member, since said member is "balanced" when the valve is closed, i. e. the force exerted by the pressure and acting on the step in one direction is counterbalanced by the axial component of the force acting on the chamfered end in the other axial direction.

The valve is extremely rapid in action. On depressing the lever it takes only a fraction of a second for the pressure to build up to the required value, and by maintaining the lever in this position the required pressure is held for as long as desirable. Should the pressure fall below this value the inlet valve will automatically open to compensate for the loss, and should the pressure exceed this value, due, for example, to the mechanism becoming heated, the exhaust valve will automatically open to allow excess pressure to blow to exhaust. The exhaust of this valve is very rapid, due to the fact that the exhaust passage is relatively large and there are no restrictions to obstruct the flow of exhaust.

The valve of the present invention need not necessarily be used in conjunction with a gun cocking mechanism, but may be used in a variety of other embodiments. The operating lever may conveniently be replaced by another type of operating means.

Having described my invention, what I claim is:

1. A fluid pressure control valve comprising a valve housing having a pressure fluid supply inlet, an opening for the passage of fluid to and from said housing and an exhaust port, an inlet valve spring pressed to closed position, an exhaust valve seat connected to said inlet valve and movable therewith, an exhaust valve movable to and from said exhaust valve seat, a spring pressed supporting member and an actuating member based on said spring pressed supporting member and movable to close said exhaust valve on said exhaust seat and to move said inlet valve to open position, said valves and valve seat being movable in the opposite direction under pressure in said housing sufficient to overbalance said spring pressed supporting element.

2. The fluid pressure control valve of claim 1 in which said actuating member is a wedge shaped cam element movable between said spring pressed supporting member and said exhaust valve.

3. The fluid pressure control valve of claim 1 in which said actuating member comprises a handle pivoted on said housing and a wedge shaped cam element pivoted on said handle and extending between said spring pressed supporting member and said exhaust valve.

4. The fluid pressure control valve of claim 3 having a pair of rollers one on said exhaust valve and the other on said spring pressed supporting member between which said wedge shaped cam projects.

5. The fluid pressure control valve of claim 1 in which said inlet valve and said exhaust valve seat are cylindrical and axially alinged and slidable axially and in which said exhaust valve is a closure moving on the axis of said exhaust valve seat.

6. A fluid pressure control valve comprising a valve housing having a pressure fluid inlet, a supply outlet and an exhaust outlet, an axially movable exhaust valve, an axially movable exhaust valve seat, an axially movable inlet valve, means connecting the exhaust valve seat with the inlet valve, an inlet valve closing spring pressing said inlet valve to closing position, a cam member movable transversely across the housing, slidable means associated with the cam member for moving the exhaust valve first to close said valve and then open the inlet valve and a return spring supporting said cam member and deflectable when a predetermined operating pressure has been attained to allow the inlet valve to close and further deflectable when said predetermined operating pressure has been exceeded to allow the exhaust valve to open.

7. A control valve according to claim 6 wherein the cam member has one end pivotally secured to a lever exterior of the housing and is provided with cam surfaces engaging with said slidable means when the lever is depressed to first close the exhaust valve and then open the inlet valve.

8. A control valve according to claim 7 wherein the cam member is provided with a steep cam surface to engage the slidable means when said lever is depressed and to move said means axially toward the exhaust valve seat until the exhaust valve closes and a shallow cam surface which upon further depression of said lever engages with said slidable means and moves said means further in the same direction to open the inlet valve.

9. A control valve according to claim 6 wherein said slidable means comprises a plunger having the exhaust valve formed at one end thereof and a diametrical slot extending across the other end, and a roller located within said slot to co-operate with the cam surface of the cam member having its axis of rotation normal to the longitudinal axis of the slot.

10. A control valve according to claim 6 comprising a return plunger one end thereof abutting said return spring and the other end having a diametrical slot extending thereacross, and a roller located within said slot to co-operate with the side of the cam member remote from said cam surface having its axis of rotation normal to the longitudinal axis of the slot.

References Cited in the file of this patent

UNITED STATES PATENTS

| Number | Name | Date |
|---|---|---|
| 1,979,062 | Huffman | Apr. 9, 1935 |
| 2,136,318 | Rossman | Nov. 8, 1938 |
| 2,225,082 | Orshansky et al. | Dec. 17, 1940 |
| 2,268,764 | Moller | Jan. 6, 1942 |
| 2,354,608 | Orshansky, Jr. | July 25, 1944 |
| 2,355,758 | Stevens | Aug. 15, 1944 |
| 2,361,773 | Knapp | Oct. 31, 1944 |
| 2,478,002 | Mott | Aug. 2, 1949 |
| 2,571,311 | Trevaskis | Oct. 10, 1951 |